3,103,403
DYEING OF POLYESTER FIBERS WITH COMPOUNDS OF THE NAPHTHOYLENE - ARYL- IMINAZOLE SERIES

David Crawford Eaton and Francis Irving, Manchester, England, assignors to Imperial Chemical Industries Limited, London, England, a corporation of Great Britain
No Drawing. Filed Feb. 6, 1961, Ser. No. 87,092
Claims priority, application Great Britain Feb. 17, 1960
5 Claims. (Cl. 8—55)

This invention relates to a colouration process and more particularly it relates to a colouration process for artificial polymeric materials.

United Kingdom patent specification No. 789,310 describes and claims a process for the production of dyestuffs of the naphthoylene-aryl-iminazole series and of the naphthaloperinone series which comprises treating textile fibres with an aqueous composition comprising an organic carboxylic acid having at least 2 carboxylic acid groups in peri position to each other, or a nuclear substitution product thereof, and an o-diamine or peri-diamine, or a substitution product thereof, and a condensing agent which is an acid or an ammonium salt thereof, and subjecting the fibres thus treated to a heat treatment.

We have now discovered that certain compounds of the naphthoylene-aryl-iminazole series may be used directly for the colouration of artificial polymeric materials, especially polystyrene and polyesters such as polyethylene terephthalate, and that the colours produced in such materials have excellent fastness to heat and to light.

According to our invention therefore we provide a process for the colouration of an artificial polymeric material selected from polystyrene, and polyesters which comprises treating said material with a colouring matter which is devoid of sulphonic acid and carboxylic acid groups and is of the formula

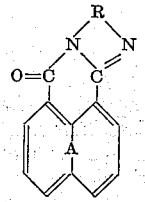

wherein R represents an o- or peri-arylene radical and the naphthalene nucleus A carries in one of the free peri-positions a radical of the formula $R^1CO$— wherein $R^1$ represents an alkyl, substituted alkyl or aralkyl radical, or any aryl radical.

As an example of a polyester which may be coloured by the process of our invention there may be mentioned polyethylene terephthalate.

As examples of o- and peri-arylene radicals represented by R there may be mentioned o-phenylene and 1:8-naphthylene and such radicals may carry substituents, for example nitro, cyano, halogeno such as chloro and bromo, alkoxy such as methoxy and butoxy, alkyl such as methyl and butyl and substituted alkyl, for example alkoxyalkyl such as ω-methoxypropyl. As a further example of a peri-arylene radical represented by R there may be mentioned the divalent radical of formula

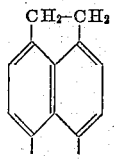

As examples of alkyl, aralkyl and aryl radicals represented by $R^1$ there may be mentioned methyl, ethyl, propyl, benzyl, phenyl, α-naphthyl and β-naphthyl. Aralkyl and aryl radicals represented by $R^1$ may carry substituents, for example halogeno such as chloro and bromo, nitro, alkyl such as methyl, and alkoxy such as methoxy. As examples of substituents which may be present in a substituted alkyl group represented by $R^1$ there may be mentioned halogeno such as chloro and bromo, alkoxy such as methoxy, alkylamino such as methylamino, and arylamino such as phenylamino.

The process of our invention may be used for colouring plastic materials by conventional means. For example the colouring matter, preferably in finely divided form may be mixed with chips of the artificial polymeric material and the mixture may be fused and masticated (or triturated on a hot roll mill), cooled and granulated by suitable means to give a coloured moulding powder. The moulding powder may then be used in the manufacture of shaped articles which are coloured in yellow to violet shades of excellent fastness to light.

Preferably however the process of our invention may be used as a means of colouring textile materials comprising fibres of the artificial polymeric material, for example polyester fibres, especially polyethylene terephthalate fibres. For this purpose the colouring matter is advantageously first dispersed in water by grinding or milling with a dispersing agent such as disodium dinaphthylmethane disulphonate. Colouration of the textile material may then be carried out with a fine aqueous suspension of the colouring matter in the presence of a carrier (for example p-hydroxydiphenyl) at or near the boiling point, or without the addition of a carrier at a temperature above 100° C. under superatmospheric pressure. The textile materials are coloured in yellow to violet shades of very good fastness to light. We find that the fastest dyeings are obtained by the use of the colouring matters wherein R represents an o-phenylene or a substituted o-phenylene radical, and those wherein $R^1$ represents a phenyl or a substituted phenyl radical.

Colouring matters suitable for use in the process of our invention may be obtained by condensation of a dicarboxylic acid of the formula

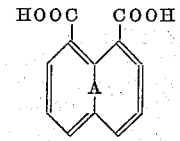

wherein the naphthalene nucleus A is substituted as previously described, with a diamine of the formula $R(NH_2)_2$, R having the meaning previously stated. The condensation may be brought about for example by heating in a suitable solvent such as acetic acid or nitrobenzene. A mixture of at least two isomers is usually obtained and, if desired, the isomers may be separated by crystallisation or other means. Mixtures obtained in this way may, however, advantageously be used in the process of the invention.

The invention is illustrated but not limited by the following examples in which the parts are by weight:

Example 1

100 parts of polyethylene terephthalate staple yarn (100 parts) is dyed for 30 minutes at 125° C. under superatmospheric pressure with a fine dispersion of 0.3 part of a mixture of 3- and 4-benzoylnaphthoylene-benzimiazole in 3000 parts of water containing a little disodium dinaphthylmethane-di-β-sulphonate. The yarn is rinsed well and treated for 15 minutes at 55° C. with a solution of 7 parts of sodium hydroxide and 2 parts of sodium hydrosulphite in 1000 parts of water. After rinsing the yarn, optionally in the presence of a detergent, a clear greenish-yellow dyeing is obtained with very good fastness to light and to dry heat.

The mixture of 3- and 4-benzoylnaphthoylenebenziminazole may be obtained by heating a mixture of 6 parts of benzoylnaphthalic acid or its anhydride, 3 parts of o-phenylenediamine and 20 parts of glacial acetic acid under reflux for 1 hour. On pouring the reaction mixture into 100 parts water, the product is obtained as a fine yellow precipitate which is isolated by filtration, washing and drying.

If the said mixture of benzoylnaphthoylenebenziminazoles is crystallised twice from n-butanol a highly crystalline product, of melting point 188° C. is obtained. When dispersed in water it dyes polyethylene terephthalate fibre in clear greenish-yellow shades of very good fastness to heat and light.

*Example 2*

Polyethylene terephthalate fabric is dyed with a mixture of benzoylnaphthoylene-chlorobenziminazoles by the dyeing procedure described in Example 1. A clear greenish-yellow dyeing is obtained having very good fastness to light and to dry heat.

The mixture of benzoylnaphthoylene chlorobenziminazoles may be obtained by reacting 7.7 parts of 4-benzoylnaphthalic acid, 5.5 parts of 4-chloro-1:2-diaminobenzene in 20 parts of glacial acetic acid according to the conditions described in Example 1.

If the said mixture of benzoylnaphthoylene chlorobenziminazoles is crystallised twice from n-butanol a highly crystalline product, of melting point 194–8° C. is obtained. When dispersed in water this also dyes polyethylene terephthalate in clear greenish-yellow shades having very good fastness to light and to dry heat.

*Example 3*

Polyethylene terephthalate fabric is dyed with a mixture of benzoylnaphthoylene-methylbenziminazoles by the dyeing procedure described in Example 1. A clear yellow dyeing of very good fastness to light and to dry heat is obtained.

The mixture of benzoylnaphthoylene-methylbenziminazoles may be obtained by reacting 4-methyl-1:2-diaminobenzene with 4-benzoylnaphthalic acid or anhydride according to conditions described in Example 1.

*Example 4*

0.2 part of the dyestuff mixture used in Example 3 is mixed with 100 parts of polystyrene which is then triturated on a hot roll mill. The mixture is then cooled and granulated and there is obtained a polystyrene moulding powder which may be converted to a fluorescent yellow moulding by heating for 15 minutes at 240° C. and then cooling. The moulding has very good light fastness and excellent heat stability.

*Example 5*

Polyethylene terephthalate fabric is dyed with a mixture of 3- and 4-acetylnaphthoylenebenziminazole by the dyeing procedure described in Example 1. A bright yellow dyeing of very good fastness to light is obtained.

The dyestuff mixture used in this example may be prepared by reacting 2.4 parts of 4-acetylnaphthalic acid or anhydride and 1.62 parts of 1:2-diaminobenzene in 15 parts of glacial acetic acid according to the conditions described in Example 1.

*Example 6*

Polyethylene terephthalate fabric is dyed with a mixture of acetylnaphthoylene-chlorobenziminazoles by the dyeing procedure described in Example 1, whereby a bright yellow dyeing of very good light fastness is obtained. The dyestuff mixture used in this example may be prepared by reacting 2.4 parts of 4-acetylnaphthalic acid or anhydride and 2 parts of 4-chloro-1:2-diaminobenzene in 15 parts of glacial acetic acid according to the conditions described in Example 1.

*Example 7*

Polyethylene terephthalate fabric is dyed with a mixture of benzoylnaphthoylene-cyanobenziminazoles by the dyeing procedure described in Example 1, whereby a greenish yellow dyeing of very good fastness to light and dry heat is obtained. The dyestuff mixture used in this example may be prepared by reacting 2 parts of 4-benzoylnaphthalic acid or anhydride and 1 part of 4-cyano-1:2-diaminobenzene in 20 parts of glacial acetic acid according to the conditions described in Example 1.

*Example 8*

Polyethylene terephthalate fabric is dyed with a mixture of benzoylnaphthaloperinones by the dyeing procedure described in Example 1 whereby a bordeaux dyeing of excellent fastness to dry heat is obtained. The dyestuff used in this example may be prepared by heating a mixture of 3 parts of 4-benzoylnaphthalic acid or anhydride, 1.75 parts of 1:8-diaminonaphthalene and 30 parts of glacial acetic acid under reflux for 8 hours. On pouring the reaction mixture into 150 parts water, the product is obtained as a dark red precipitate which is isolated by filtration, washing with water and drying.

*Example 9*

Polyethylene terephthalate fabric is dyed with a mixture of acetylnaphthaloperinones obtained as described below, by the dyeing procedure described in Example 1 whereby a dyeing of excellent fastness to dry heat is obtained. The dyestuff used in this example may be prepared by reacting 3 parts of 4-acetylnaphthalic acid or anhydride and 2.2 parts of 1:8-diaminonaphthalene in 60 parts of glacial acetic acid according to the conditions described in Example 1.

*Example 10*

Polyethylene terephthalate fabric is dyed with a mixture of n-butyrylnaphthoylene benziminazoles by the dyeing procedure described in Example 1 whereby a clear yellow dyeing of very good fastness to light is obtained. The dyestuff mixture used in this example may be prepared by reacting 2.82 parts of 4-n-butyrylnaphthalic acid or anhydride and 1.3 parts of 1:2-diaminobenzene according to the conditions described in Example 1. 4-n-butyrylnaphthalic acid or anhydride may be obtained by reacting acenaphthene with 1 molecular equivalent of n-butyrylchloride and oxidising the resultant 5-n-butyrylacenaphthene according to the method described by Graebe in Liebig's Annalen, volume 327, page 94.

*Example 11*

Polyethylene terephthalate fabric is dyed with a mixture of n-butyrylnaphthoylene-chlorbenziminazoles by the dyeing procedure described in Example 1 whereby a clear yellow dyeing of very good fastness to light is obtained. The dyestuff mixture used in this example may be prepared by reacting 2.82 parts of 4-n-butyrylnaphthalic acid or anhydride and 1.7 parts of 4-chloro-1:2-diaminobenzene in 20 parts of glacial acetic acid according to the conditions described in Example 1.

*Example 12*

Polyethylene terephthalate fabric is dyed with a mixture of n-butyrylnaphthaloperinones by the dyeing procedure described in Example 1 whereby a strong bordeaux dyeing of very good fastness to dry heat is obtained. The dyestuff mixture used in this example may be prepared by reacting 2.82 parts of 4-n-butyrylnaphthalic acid or anhydride and 1.75 parts of 1:8-diaminonaphthalene in 30 parts of glacial acetic acid according to the conditions described in Example 1.

Example 13

Polyethylene terephthalate fabric is dyed with a mixture of n-butyrylnaphthoylene-methyl-benziminazoles by the dyeing procedure described in Example 1 whereby a yellow dyeing of very good fastness to light is obtained. The dyestuff mixture used in this example may be prepared by reacting 1.41 parts of 4-n-butyrylnaphthalic acid or anhydride and 0.75 part of 1-methyl-3:4-diaminobenzene in 20 parts of glacial acetic acid according to the conditions described in Example 1.

Example 14

Polyethylene terephthalate fabric is dyed with a mixture of benzoylnaphthoylene-methoxybenziminazoles by the dyeing procedure described in Example 1 whereby a strong yellow dyeing of very good fastness to light and dry heat is obtained. The dyestuff mixture used in this example may be prepared by reacting 3.02 parts of 4-benzoylnaphthalic acid or anhydride and 2.07 parts of 4-methoxy-1:2-diaminobenzene in 25 parts of glacial acetic acid according to the conditions described in Example 1. If desired the dyestuff may be purified by dissolving in hot n-butanol and cooling the solution and filtering off the solid which separates.

Example 15

Polyethylene terephthalate fibre is dyed with a mixture of acetylnaphtheylene-methoxy-benziminazoles by the dyeing procedure described in Example 1, whereby a strong yellow dyeing of very good fastness to light is obtained. The dyestuff mixture used in this example may be prepared by reacting 2 parts of 4-acetylnaphthalic acid or anhydride and 1.4 parts of 4-methoxy-1:2-diaminobenzene in 20 parts of glacial acetic acid according to the conditions described in Example 1.

Example 16

Polyethylene terephthalate fabric is dyed with a mixture of benzoylnaphthoylenenitrobenziminazoles by the dyeing procedure described in Example 1 whereby a greenish yellow dyeing of very good fastness to dry heat is obtained. The dyestuff mixture used in this example may be prepared by reacting 2.64 parts of 4-benzoylnaphthalic acid or anhydride and 1.5 parts of 4-nitro-1:2-diaminobenzene in 25 parts of glacial acetic acid according to the conditions described in Example 1.

Example 17

Polyethylene terephthalate fabric is dyed with a mixture of acetylnaphthoylene-nitrobenz-iminazoles by the dyeing procedure described in Example 1 whereby a clear yellow dyeing is obtained. The dyestuff mixture used in this example may be prepared by reacting 1.7 parts of 4-acetylnaphthalic acid or anhydride and 1.25 parts of 4-nitro-1:2-diaminobenzene in 20 parts of glacial acetic acid according to the conditions described in Example 1.

Example 18

Polyethylene terephthalate fabric is dyed with a mixture of benzoylnaphthoylene-n-butylbenziminazoles by the dyeing procedure described in Example 1 whereby a yellow dyeing of very good fastness to light and dry heat is obtained. The dyestuff mixture used in this example may be prepared by reacting 2 parts of 4-benzoylnaphthalic acid or anhydride and 1.32 parts of 4-n-butyl-1:2-diaminobenzene in 20 parts of glacial acetic acid according to the conditions described in Example 1.

Example 19

Polyethylene terephthalate fabric is dyed with a mixture of p-chlorobenzoylnaphthoylene-n-butylbenziminazoles by the dyeing procedure described in Example 1 whereby a clear yellow dyeing of very good fastness to light and dry heat is obtained. The dyestuff mixture used in this example may be prepared by reacting 2 parts of 4-p-chlorbenzoylnaphthalic acid or anhydride and 1.3 parts of 4-n-butyl-1:2-diaminobenzene in 20 parts of glacial acetic acid according to the conditions described in Example 1. 4-p-chlorobenzoylnaphthalic acid or anhydride may be obtained by reacting acenaphthene with 1 molecular equivalent of p-chlorbenzoylchloride and oxidising the resultant 5-p-chlorbenzoylacenaphthene by the method described by Graebe in Liebig's Annalen, volume 327, page 94.

Example 20

Polyethylene terephthalate fabric is dyed with a mixture of p-chlorbenzoylnaphthoylene-methoxybenziminazoles by the dyeing procedure described in Example 1 whereby a clear yellow dyeing of very good fastness to light and dry heat is obtained. The dyestuff mixture used in this example may be prepared by reacting 3.4 parts of 4-p-chlorbenzoylnaphthalic acid or anhydride and 2.1 parts of 4-methoxy-1:2-diaminobenzene in 40 parts of glacial acetic acid according to the conditions described in Example 1.

Example 21

Polyethylene terephthalate fabric is dyed with a mixture of benzoylnaphthoylene-n-butoxy benziminazoles by the dyeing procedure described in Example 1 whereby a yellow dyeing of very good fastness to light and dry heat is obtained. The dyestuff used in this example may be prepared by reacting 2 parts of 4-benzoylnaphthalic acid or anhydride and 2 parts of 4-n-butoxy-1:2-diaminobenzene in 20 parts of glacial acetic acid according to the conditions described in Example 1. If desired, the dyestuff may be purified by dissolving in hot isopropanol, cooling and filtering off the solid which separates.

4-n-butoxy-1:2-diaminobenzene may be prepared by nitrating p-n-butoxyacetanilide with one molecular equivalent of nitric acid at about 0° C., hydrolysing the product so obtained with dilute mineral acid to give 4-n-butoxy-2-nitroaniline, which may then be reduced to 4-n-butoxy-1:2-diaminobenzene by a suitable reagent for example sodium sulphide.

Example 22

Polyethylene terephthalate fabric is dyed with a mixture of acetylnaphthoylene-n-butoxybenziminazoles by the dyeing procedure described in Example 1, whereby a yellow dyeing of very good fastness to light is obtained. The mixture of acetylnaphthoylene-n-butoxybenziminazoles used in this example may be obtained by using 1.6 parts of 4-acetylnaphthalic acid or anhydride in place of the 2 parts of 4-benzoylnaphthalic acid or anhydride used in the procedure described in Example 21.

Example 23

Polyethylene terephthalate fabric is dyed with a mixture of p-methoxybenzoylnaphthoylenebenziminazoles by the dyeing procedure described in Example 1 whereby a yellow dyeing of very good fastness to light and dry heat is obtained. The dyestuff mixture used in this example may be prepared by reacting 3.32 parts of p-methoxybenzoylnaphthalic acid or anhydride and 1.2 parts of 1:2-diaminobenzene in 20 parts of glacial acetic acid according to the conditions of Example 1. 4-p-methoxybenzoylnaphthalic acid or anhydride may be obtained by reacting acenaphthene with 1 molecular equivalent of p-methoxybenzoylchloride and oxidising the product of the method described in Liebig's Annalen, volume 327, page 94.

Example 24

Polyethylene terephthalate fabric is dyed with a mixture of p-methoxybenzoylnaphthoylene-chlorbenziminazoles whereby a yellow dyeing of very good fastness to light and dry heat is obtained. The dyestuff mixture used in this example may be obtained by using 1.6 parts of 4-chloro-1:2-diaminobenzene instead of 1.2 parts of 1:2-diaminobenzene in the procedure described in Example 23.

*Example 25*

Polyethylene terephthalate fabric is dyed with a mixture of β-ethoxypropionylnaphthoylene-methylbenziminazoles by the dyeing procedure described in Example 1, whereby a yellow dyeing of very good fastness to light is obtained. The dyestuff mixture used in this example may be prepared by reacting 2.98 parts of 4-β-ethoxypropionylnaphthalic acid or anhydride and 1.34 parts of 4-methyl-1:2-diaminobenzene in 20 parts of glacial acetic acid according to the conditions described in Example 1. 4-β-ethoxypropionylnaphthalic acid or anhydride may be prepared by reacting acenaphthene with 1 molecular equivalent of β-ethoxypropionylchloride and oxidising the product as described in Liebig's Annalen, volume 327, page 94.

*Example 26*

Polyethylene terephthalate fibre is dyed with a mixture of n-butyrylphthaloaceperinones by the dyeing procedure described in Example 1 whereby a violet dyeing of excellent fastness to dry heat is obtained. The dyestuff mixture used in this example may be prepared by reacting 2.62 parts of 4-n-butyrylnaphthalic acid or anhydride and 2 parts of 5:6-diaminoacenaphthen in 60 parts of glacial acetic acid using the condensation conditions described in Example 1.

*Example 27*

Polyethylene terephthalate fabric is dyed with a mixture of β-ethoxypropionylnaphthalo-perinones by the dyeing procedure described in Example 1, whereby a bordeaux dyeing of very good fastness to dry heat is obtained. The dyestuff mixture used in this Example may be prepared by reacting 2.98 parts of 4-β-ethoxypropionylnaphthalic acid or anhydride with 1.74 parts of 1:8-diaminonaphthalene in 60 parts of glacial acetic acid using the condensation conditions described in Example 1.

What we claim is:

1. A process for the coloration of a polyethylene terephthalate textile material which comprises treating said material in an aqueous medium with a coloring matter free from sulphonic acid and carboxylic acid groups and having the formula:

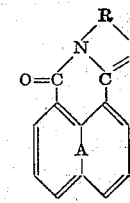

wherein R is selected from the class consisting of o- and peri-arylene radicals and the naphthalene nucleus A carries in one of the free peri-positions a radical of the formula $R^1CO-$ wherein $R^1$ represents a member selected from the class consisting of alkyl, substituted alkyl, aralkyl and aryl radicals.

2. Process according to claim 1 wherein R represents a member selected from the class consisting of o-phenylene and substituted o-phenylene radicals.

3. Process according to claim 1 wherein $R^1$ represents a member selected from the class consisting of phenyl and substituted phenyl radicals.

4. Process according to claim 1 wherein the textile material is treated with an aqueous dispersion of the dyestuff in the presence of a carrier at a temperature approximately the boiling point.

5. Process according to claim 1 wherein the textile material is treated with an aqueous dispersion of the dyestuff at a temperature above 100° C.

References Cited in the file of this patent

UNITED STATES PATENTS 2,955,902  Merian _____ Oct. 11, 1960

FOREIGN PATENTS 789,310  Great Britain _____ Jan. 15, 1958